United States Patent
Jagemann

(10) Patent No.: US 7,372,625 B2
(45) Date of Patent: May 13, 2008

(54) DEVICE FOR RETAINING OPTICAL COMPONENTS

(75) Inventor: Oliver Jagemann, Goettingen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 234 days.

(21) Appl. No.: 11/252,005

(22) Filed: Oct. 17, 2005

(65) Prior Publication Data

US 2006/0103920 A1 May 18, 2006

(30) Foreign Application Priority Data

Oct. 18, 2004 (DE) ............... 10 2004 050 639
Dec. 22, 2004 (DE) ............... 10 2004 061 901

(51) Int. Cl.
*G02B 21/00* (2006.01)
*F16H 1/18* (2006.01)

(52) U.S. Cl. .............. 359/368; 359/819; 359/381; 250/231.14; 74/424.82

(58) Field of Classification Search ........ 359/368–390, 359/808–830; 250/231.14; 74/424.82
See application file for complete search history.

(56) References Cited

U.S. PATENT DOCUMENTS 4,486,078 A * 12/1984 Hashimoto et al. ......... 359/381
4,961,636 A    10/1990 Gaul et al. .................. 359/381
5,576,897 A *  11/1996 Kuo ........................... 359/822
6,384,992 B1   5/2002 Weiss ......................... 359/819
6,792,822 B2 * 9/2004 Ninomiya ................ 74/424.82
7,057,162 B2 * 6/2006 Rentzsch ............... 250/231.14
2004/0061861 A1  4/2004 Rentzsch ................... 356/450
2006/0228061 A1* 10/2006 Kuo ........................... 384/448

FOREIGN PATENT DOCUMENTS

| DE | 37 11 843 | 9/1988 |
| DE | 199 36 497 | 4/2001 |
| DE | 102 45 170 | 4/2004 |

* cited by examiner

Primary Examiner—Thong Q Nguyen
(74) Attorney, Agent, or Firm—Darby & Darby

(57) ABSTRACT

A device for retaining optical components includes a number of open orifices disposed next to one another in an arrangement. A raceway corresponding to the arrangement is provided, the raceway including a number of detents. A ball bearing follows the raceway and cooperates with the detents so that each of the detents is brought, in a respective following direction, into click-stop engagement with the ball bearing so as to hold the orifices in a selected position. Each of the detents has, in the respective following direction, a profile including a combination of an outer and an inner arc-shaped profile. The outer profile has less curvature than the inner profile and surrounds the inner profile.

8 Claims, 7 Drawing Sheets

DEVICE FOR RETAINING OPTICAL COMPONENTS

CROSS REFERENCE TO RELATED APPLICATIONS

Priority is claimed to German patent applications 10 2004 050 639.6 and 10 2004 061 901 8, the entire subject matters of both of which are hereby incorporated by reference herein.

FIELD OF THE INVENTION

The invention relates to a device for retaining optical components, the device comprising open orifices arranged next to one another, and a raceway having detents being provided in the direction of the arranged orifices, which detents are embodied in such a way that they are to be brought into click-stop engagement with a ball bearing circulating along the raceway, in order to hold the device in a selected position. The invention relates in particular to a rotary disk for retaining optical components, the rotary disk comprising in its center an opening for a rotation axis open orifices being arranged on a circular track concentric with the rotation axis, and a raceway concentric with the rotation axis and having detents being provided on the rotary disk, which detents are embodied in such a way that they are to be brought into click-stop engagement with a ball bearing circulating on the raceway, in order to hold the rotary disk in a selected position. The invention furthermore relates, in particular, to a corresponding longitudinal slider which comprises open orifices arranged next to one another in the longitudinal direction, and in which a corresponding raceway having detents is provided in the longitudinal direction.

BACKGROUND OF THE INVENTION

Rotary disks and longitudinal sliders of this kind for retaining optical components are known for example, from DE 199 36 497 C2. A rotary disk discussed therein comprises a rotation axis as well as eight open orifices. The rotary disk possesses on its outer rim a tooth set into which the pinion of a drive motor engages in order to rotate the rotary disk about its rotation axis. Mounted on the underside of the rotary disk is a cylindrical holder having eight beveled sides, each of the beveled sides comprising a retaining mechanism for optical components, such as fluorescence filter blocks, that are to be mounted. After mounting of the optical component, it is located below an open orifice of the rotary disk. With this embodiment it is possible to retain eight optical components on the rotary disk.

Also located on the outer rim of the rotary disk according to DE 199 36 497 C2, between the open orifices, are respective detent grooves that interact with a detent apparatus mounted on the rim of the rotary disk in such a way that the rotary disk can be held in a specific position. For that purpose, the detent apparatus contains a spring-mounted ball bearing that can run along a raceway equipped with the detent grooves. Upon encountering a detent groove, a portion of the bearing engages into the groove so that a click-stop engagement results. These detent grooves are necessary for highly precise positioning of the rotary disk, and for securing in the selected position. The detent groove disclosed in the aforesaid document possesses a rectangular U-shaped profile.

V-shaped profiles for such detent grooves or detents are also known. The disadvantage of these profiles is, however, that the ball bearing enters the detent with a sharp impact, so that vibrations can occur. Furthermore, with the known profiles the capture region of the detent is small, so that the drive motor of the rotary disk cannot be stopped until click-stopping occurs.

The rotary disk described in the aforesaid document DE 199 36 497 C2, and an analogously functioning longitudinal slider with which the optical components can be held and displaced in a longitudinal direction, serve therein in particular to hold fluorescence filter blocks in a fluorescence microscope. Associated with each position is a readable code on the rotary disk that provides information as to the properties of the particular filter block that is pivoted in. The fluorescence filter blocks are pivoted into the illumination and image beam paths of the fluorescence microscope in such a way that the light of a light source is directed in filtered fashion onto a specimen, and so that light proceeding from the specimen passes, via an objective, through a further filter of the fluorescence filter block, traverses the open orifice of the rotary disk, and from there enters the eyepiece of the microscope. Whereas the subject of the aforesaid German patent application is the holders for the filter blocks, the present invention is directed toward detents, which are responsible in such a device for defined positioning of the optical components associated with the device. The intention is to overcome the disadvantages, discussed above, of the previously known detents.

SUMMARY OF THE INVENTION

The present invention provides a device for retaining optical components and a microscope including the device. The device includes a plurality of open orifices disposed next to one another in an arrangement and a raceway corresponding to the arrangement. The raceway includes a plurality of detents and a ball bearing configured to follow the raceway and cooperate with the detents so that each of the detents is brought, in a respective following direction, into click-stop engagement with the ball bearing in order to hold the orifices in a selected position. Each of the detents has, in the respective following direction, a profile including a combination of an outer and an inner arc-shaped profile. The outer arc-shaped profile has less curvature than the inner arc-shaped profile and surrounds the inner arc-shaped profile. The outer and inner arc-shaped profiles are circular arcs of respective first and second circles. The first has a larger radius than the second circle and each of the circles has a different respective center point. The radius of the first circle is larger than the radius of the ball of the ball bearing and the radius of the second circle is smaller than the radius of the ball of the ball bearing.

BRIEF DESCRIPTION OF THE DRAWINGS

The invention and its advantages will be explained in more detail below based on exemplary embodiments with reference to the drawings.

DETAILED DESCRIPTION OF THE INVENTION

Figure 1:
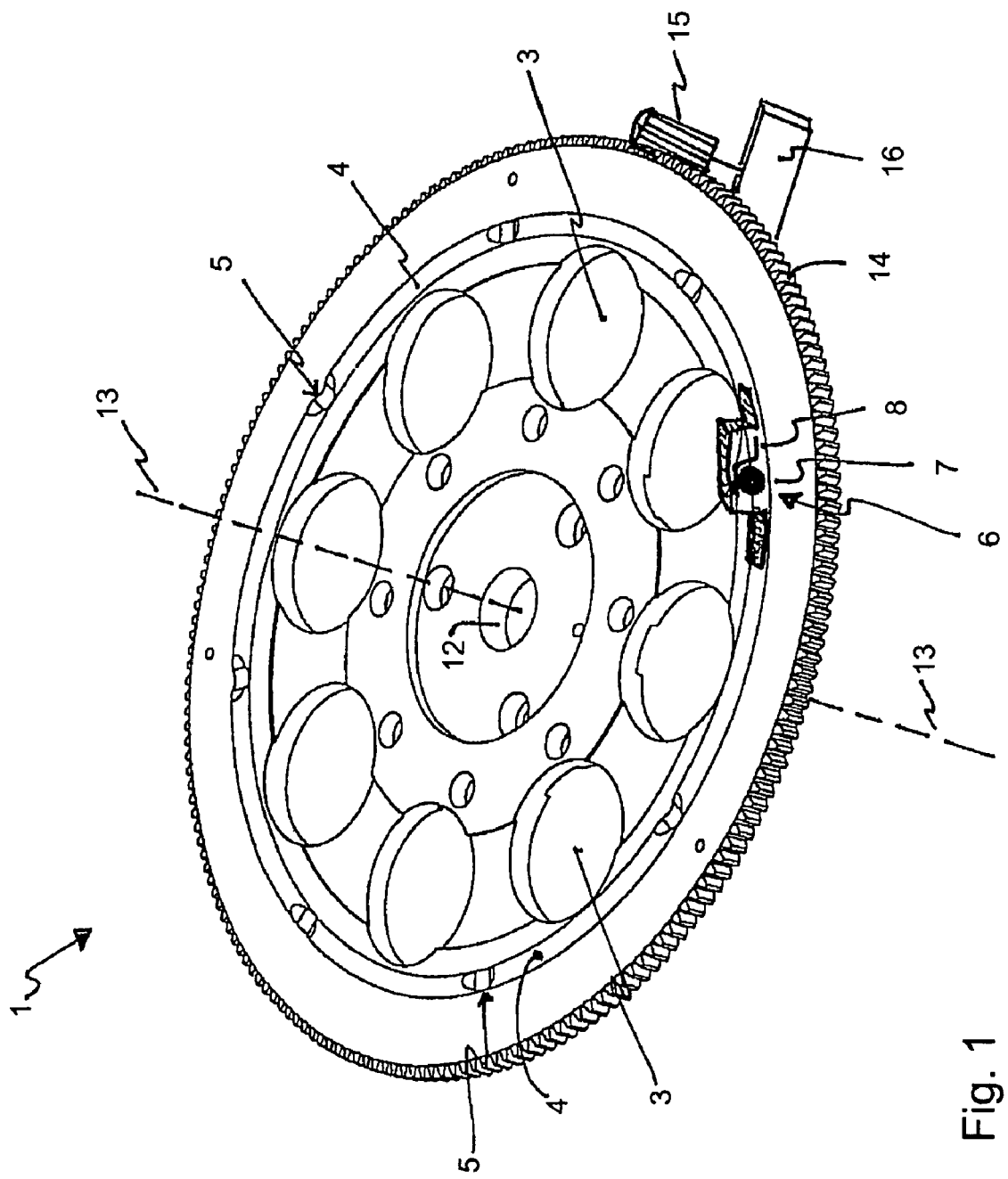
FIG. 1 schematically shows a rotary disk according to the present invention for retaining optical components.

The profile of a detent according to the present invention comprises a more strongly curved round (or arc-shaped) profile at the center, which transitions into a more gently curved (round or arc-shaped) profile toward the two flanks.

The result of this is that a ball bearing can click-stop into the detent gently and therefore with little vibration. This is because what occurs is not an abrupt click-stopping after the ball runs over the edge of a V-groove or a rectangular U-groove, but instead a gentle rolling into the detent according to the present invention, which is completed when the ball has reached the more strongly curved region of the detent. Provision can be made here either for the ball to be partly surrounded by the more strongly curved region of the detent (i.e. by the inner profile), or for the ball to rest on the edges of the inner profile, i.e. at the point where the inner profile transitions into the outer profile. It is important to ensure that the positioning as a result of the click-stopping remains stable and is maintained without play, but on the other hand that when the drive motor is once again set in motion, the detent can be overcome again in relatively resistance-free fashion.

The device according to the present invention having the detent described has the further advantage of a large capture region, i.e. the motor can be shut off as soon as the ball reaches the first edge of the detent, i.e. at the moment when the ball enters the outer arc-shaped profile of the detent. The ball is then constrainedly guided within the detent until click-stop engagement occurs. The invention thus allows stress both on the bearing rollers and on the driving motor and its shaft to be minimized. Customer desires that exist for low-vibration adjustment of the optical assemblage are moreover met with the detent according to the present invention. This is accompanied by the quietest possible working noise when working with the corresponding optical components.

Each of the arc-shaped profiles of the detent can have any desired round geometry, i.e. can also be, for example, parabolic or circular or part of an ellipse. A circular profile is relatively easy to implement here in terms of production engineering. Furthermore, the inner and outer arc-shaped profiles can have a common axis of symmetry, so that the detent as a whole is symmetrical with respect to this axis of symmetry. It is also conceivable, however, for the inner and the outer profile not to have any common axis of symmetry, so that entry into the detent and emergence from the detent can be configured in geometrically different fashion.

The device according to the present invention having the above-described detent, and its advantages are achieved in entirely analogous fashion for both a rotary disk and a longitudinal slider for retaining optical components. In this context, the rotary disk comprises at its center an opening for a rotation axis, open orifices being arranged on a circular path concentric with the rotary axis, and a raceway concentric with the rotation axis and having the detents being provided on the rotary disk, which detents are embodied in such a way that they are to be brought into click-stop engagement with a ball bearing circulating on the raceway, in order to hold the rotary disk in a selected position. The longitudinal slider comprises open orifices arranged next to one another in the longitudinal direction, a raceway having detents being in turn provided in the longitudinal direction, which detents are embodied in such a way that they are to be brought into click-stop engagement with a ball bearing running along the raceway, in order to hold the longitudinal slider in a selected position.

In addition to the aforementioned rotary disk and longitudinal slider, other geometries are of course conceivable for retaining optical components and for bringing selected optical components into a fixed position. The invention can easily be transferred to such other suitable geometries. A rotary disk or longitudinal slider will serve hereinafter as an example of the claimed device, without constant explicit reference to that device.

It is advantageous if the detent comprises two arc-shaped profiles that each represent a circular arc, the circular arc of the outer profile being associated with a circle having a larger radius than the circle belonging to the circular arc of the inner profile. The configuration of the U-shaped profiles as circular arcs has the advantage that the detents are easier to manufacture, and furthermore allows a gentle, low-vibration click-stopping with a large capture region. With this embodiment, the circles associated with the profiles do not have a common center point. It is advantageous to have a detent that is symmetrical with regard to entry into and emergence from the detent, so that in this case the center points of the associated circles are located, offset from one another, on the axis of symmetry of the profiles.

It is advantageous if the two circle radii of the associated circular arcs of the profiles are selected in such a way that they are respectively larger and smaller than the radius of the ball running in the ball bearing. With the embodiment just mentioned, the radius of the ball spring-mounted in the ball bearing and running along the raceway on the rotary disk or on the longitudinal slider is consequently taken into account in dimensioning the circular arcs of the profiles of the detent according to the present invention.

It is advantageous if the rotary disk comprises on its outer rim a tooth set that is embodied for the engagement of a motor-driven pinion, in order to rotate the rotary disk about the rotation axis. In the same fashion, it is useful if the longitudinal slider comprises on its outer rim a tooth set of that kind, so that the longitudinal slider can be moved in the longitudinal direction by means of a motor-driven pinion. The raceway of the rotary disk or longitudinal slider according to the present invention, with its detents, can then extend above or below the outer rim with tooth set; the raceway can additionally be offset to the front or rear, with respect to the outer rim with tooth set, in the plane of the rotary disk or of the longitudinal slider. It is also possible, however, to provide the raceway having the detents on the upper side of the rotary disk or of the longitudinal slider. Important, of course, is a corresponding alignment of the detent apparatus containing the spring-mounted ball bearing.

It is furthermore useful if the detents are located between the open orifices of the rotary disk or of the longitudinal slider, in order to eliminate the risk of collisions with the optical components located in the vicinity of the orifices.

It is additionally desirable if the rotary disk or the longitudinal slider bears at suitable positions, for example on the outer rim near an open orifice, a respective code that can be read, for example, by means of a reading device, so that the position at which the rotary disk or longitudinal slider has just arrived is automatically detectable.

The rotary disk and longitudinal disk, or in general the device, according to the invention are provided in particular for the purpose of being joined on one side to a retaining device for retaining optical components, the retainers for the optical components being arranged in such a way that each optical component can be associated with an open orifice in the rotary disk or longitudinal slider.

The retainers for the optical components can take the shape of pins, springs, and dovetail retainers, as described in the DE 199 36 497 C2 discussed above. Other retainer shapes are, of course, conceivable and known to one skilled in the art.

The present invention is suitable in combination with a microscope, in particular a fluorescence microscope in which an illumination beam path directed onto a specimen and an image beam path proceeding from the specimen are present, a rotary disk or a longitudinal slider or in general a device according to the invention being provided in order to bring into the illumination and/or image beam path of the microscope a selectable optical component that is retained on the rotary disk or longitudinal slider. The open orifices in the rotary disk or longitudinal slider allow the respective beam path to pass through without optical influence. It would also be conceivable to use the open orifices in turn for further optical influencing, by introducing optical components (e.g. filters) into the open orifices.

FIG. 1 is a perspective sketch of a rotary disk according to the present invention for retaining optical components. Rotary disk 1 comprises at its center an opening 12 for a rotation axis 13, open orifices 3, in this exemplifying embodiment eight in number, being arranged on a circular path concentric with rotation axis 13. A raceway 4, concentric with rotation axis 13 and having eight detents 5, is provided on rotary disk 1. The detents guarantee highly accurate positioning of rotary disk 1, thereby ensuring that optical components (for example fluorescence filter blocks) retained on rotary disk 1 can be brought into an exact position in an optical device (e.g. a fluorescence microscope) and held there.

Rotary disk 1 depicted in FIG. 1 can be rotated in motor-driven fashion about rotation axis 13. Provided for that purpose on the outer rim of rotary disk 1 is a tooth set 14 into which engages a pinion 15 to which, in turn, a rotary motion is imparted by a drive motor 16. By means of a corresponding control system, it is thus possible to arrive in motor-driven fashion at a specific position of the rotary disk and thus at a specific optical component. As soon as that position is reached, motor 16 is switched off and detent 5 takes over highly precise positioning. Provided for this purpose is a ball bearing 6 that enters into interaction with a detent 5 by the fact that ball 7 engages into detent 5. Ball 7 is spring-mounted, this spring-mounting being illustrated by leaf spring 8 depicted schematically in FIG. 1.

The configuration according to the present invention of detents 5 is evident from the embodiment according to FIG. 1. This detent 5 is a combination of two arc-shaped profiles having a common axis of symmetry, the outer profile of lesser curvature surrounding the inner profile of greater curvature. Ball 7 thus initially enters the region of the outer profile of lesser curvature, and is then guided into the region of the inner profile of greater curvature. This mechanism can be elucidated with reference to FIG. 2.

Figure 2:
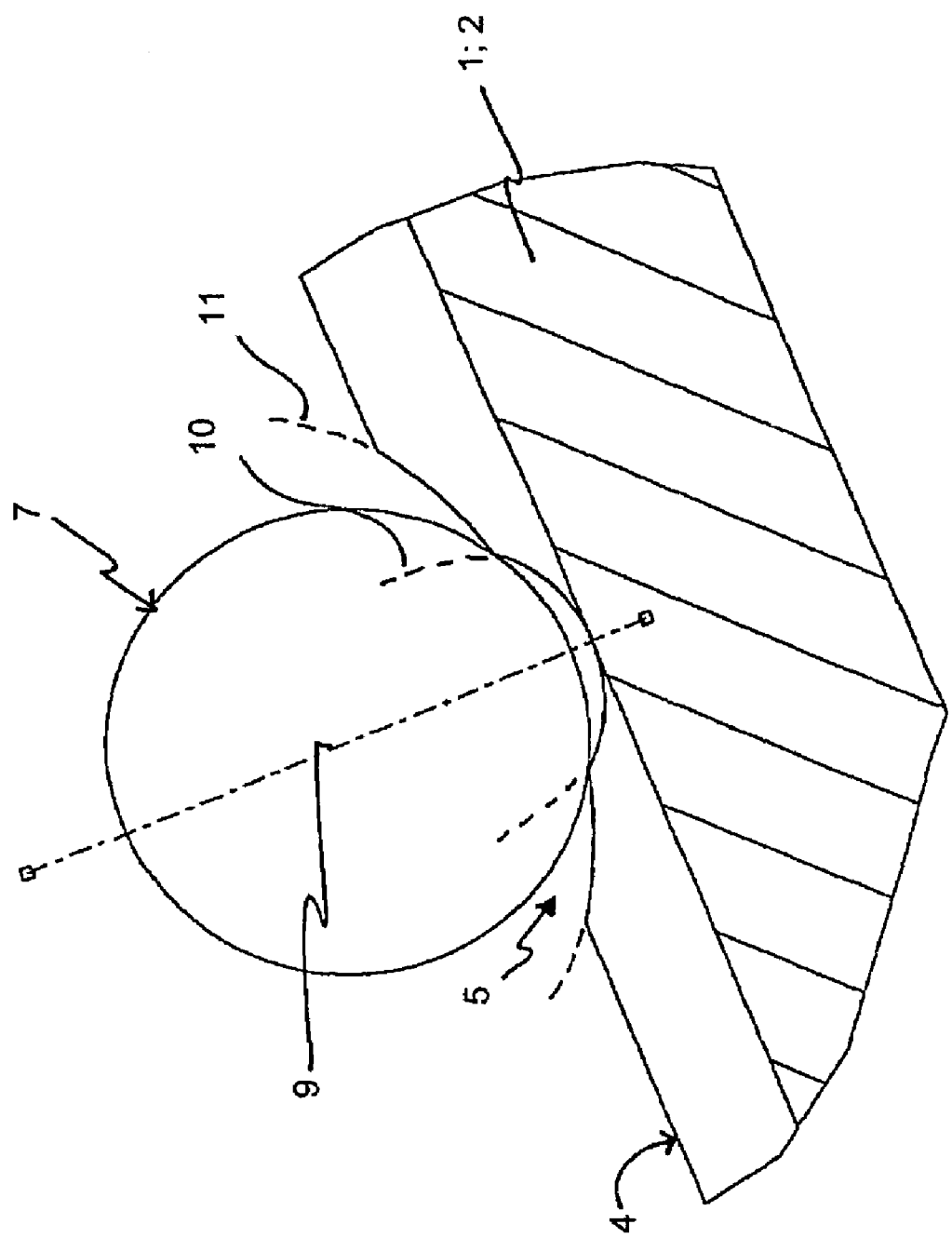
FIG. 2 shows a spring-mounted ball in click-stop engagement with a detent, in a advice according to the present invention for retaining optical components.

FIG. 2 depicts, in cross section, ball 7 of ball bearing 6 as well as detent 5 according to the present invention in a raceway 4 of a device for retaining optical components, i.e. in this case a rotary disk 1 or a longitudinal slider 2. The two arc-shaped profiles 10 and 1, having the common axis of symmetry 9, are clearly visible. Profile 10 has a greater curvature than profile 1; in the exemplifying embodiment depicted, ball 7 is held in the transition region of the two profiles, i.e. on the edge of inner profile 10.

As soon as ball 7 reaches the outer region of detent 5, drive motor 16 of rotary disk 1 (see FIG. 1) can be switched off. Ball 7 is then constrainedly guided into the position shown in FIG. 2, where it reaches its fixed position. Click-stopping occurs gently and with little vibration. It is thus possible to work without vibration, while simultaneously minimizing stress on the mechanical components. At the same time, the capture region of detent 5 is larger than with comparable known U- or V-shaped profiles. The embodiment depicted furthermore permits low-vibration release of the click-stop engagement once drive motor 16 is switched on again.

Figure 3:
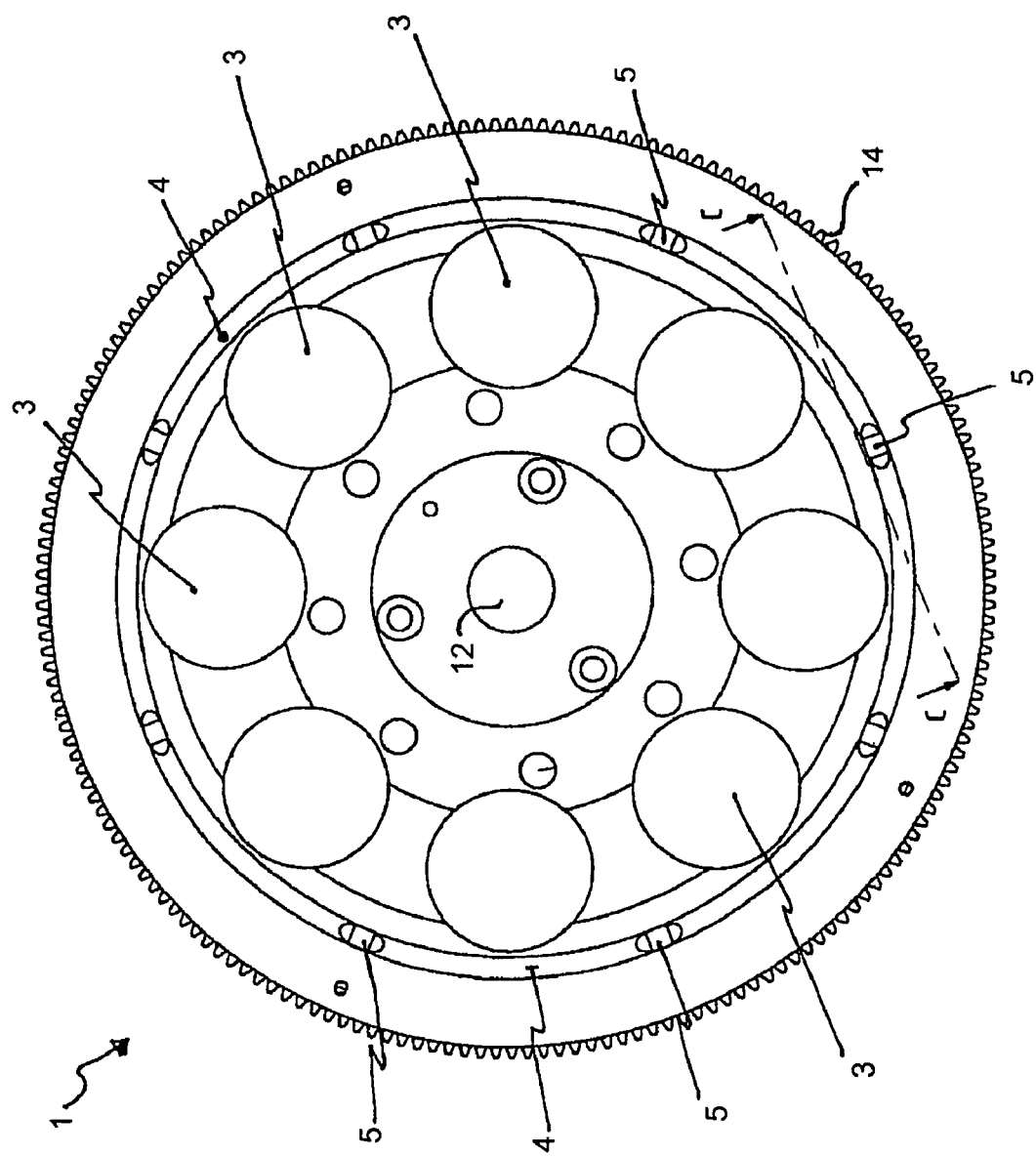
FIG. 3 is a schematic plan view of the rotary disk according to FIG. 1.
Figure 4:
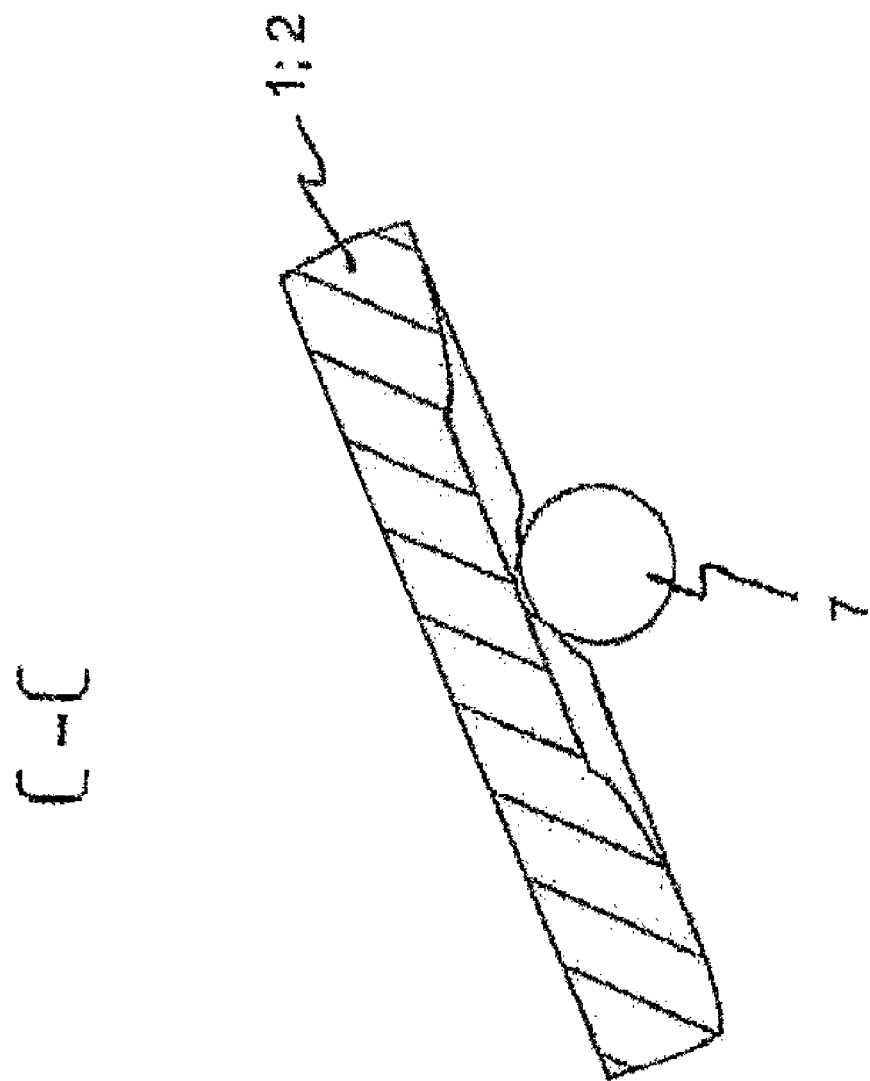
FIG. 4 is a cross section along line C-C of FIG. 3.

FIG. 3 shows rotary disk 1 according to the present invention of FIG. 1, in a plan view from above. Identical components are labeled with the same reference characters. In connection with the explanations of FIG. 3, the reader is referred to the detailed depiction of rotary disk 1 in FIG. 1. A section line C-C along a detent 5 is depicted in FIG. 3, and FIG. 4 schematically depicts the cross section along that line C-C perpendicular to the drawing plane. FIG. 4 moreover depicts a ball 7 that is in engagement with detent 5.

Figure 5:
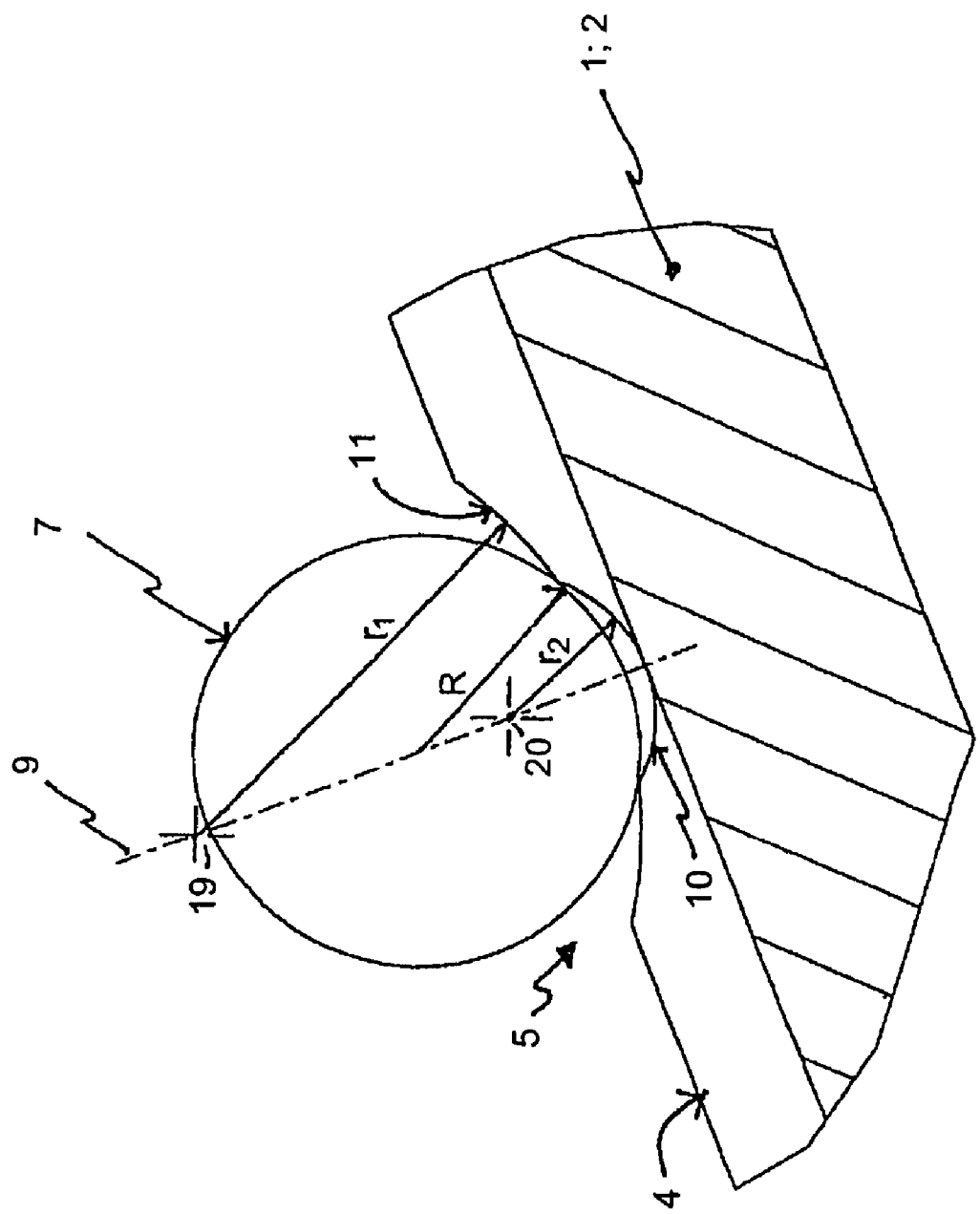
FIG. 5 shows a detent in a device according to the present invention, having two profiles corresponding to circular arcs.

FIG. 5 shows a detent 5, having two circular arc-shaped profiles 10 and 11, in a device 1, 2 according to the present invention. The depiction corresponds substantially to that of FIG. 2, identical components being labeled with identical reference characters. Located in raceway 4 of rotary disk 1 or longitudinal slider 2 according to the present invention is detent 5, which in this exemplifying embodiment comprises an inner circular profile 10 and an outer circular profile 11. The circular arc of inner profile 10 is more strongly curved than the circular arc of outer profile 11. The profile of detent 5 can thus also be described as a superimposition of two circular radii of different sizes without a common center point. Because detent 5 is symmetrical, center points 19, 20 are located on axis of symmetry 9 at an offset from one another. The number 19 designates the center point of circle radius $r_1$ that belongs to the circular arc of outer profile 11, and 20 designates the center point of circle radius $r_2$ that belongs to the circular arc of inner profile 10. It is evident from the depiction in FIG. 5 that the radius R of ball 7 possesses a value that advantageously lies between the two circular radii $r_1$ and $r_2$.

Figure 6:
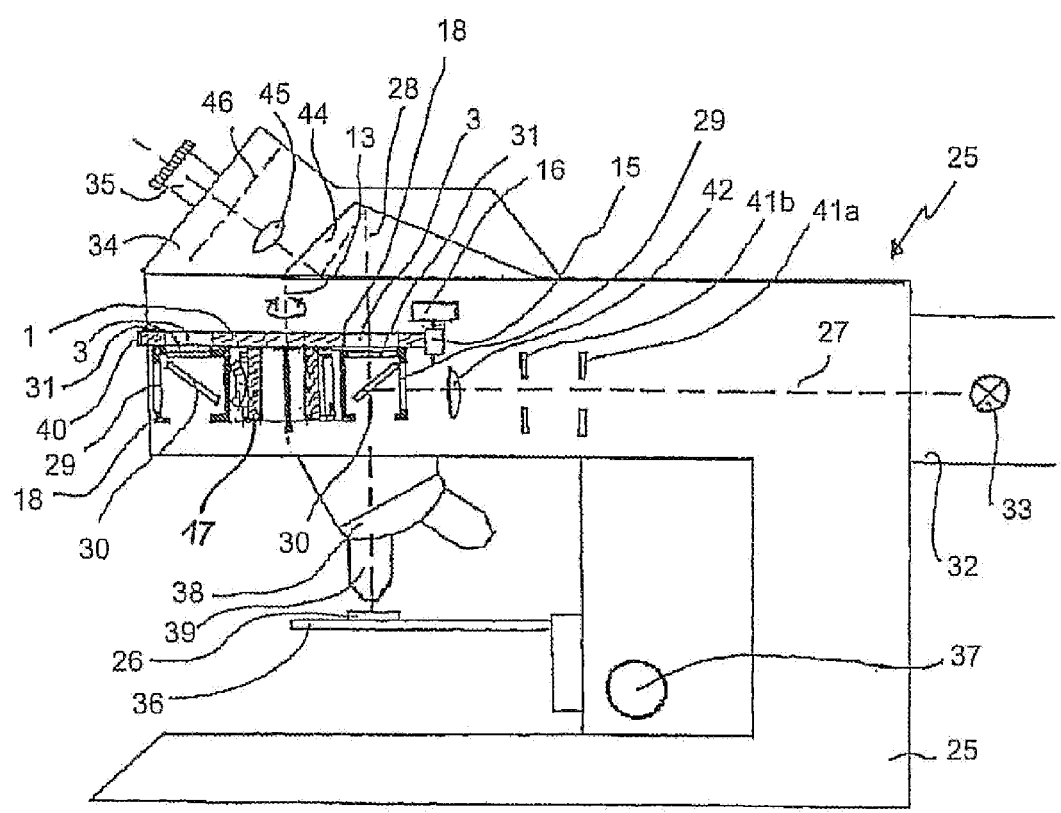
FIG. 6 shows a microscope having a rotary disk according to the present invention and a retaining device for optical components.

FIG. 6 shows a microscope 25, embodied here as a fluorescence microscope 25, in longitudinal section. Built into microscope 25 is a cylindrical retaining device 17 on which multiple optical components 18, embodied here as fluorescence filter blocks 18, are mounted. Fluorescence microscope 25 possesses a lamp housing 32 having an integrated light source 33, a tube 34 having eyepieces 35, and an objective nosepiece 38 having an objective 39 that can be pivoted into tee optical axis. Below the objective, a specimen 26 rests on a specimen stage 36 that is adjustable in height via an adjusting unit 37.

An illumination beam path 27 proceeds from light source 33 and is guided through apertures 41a, 41b, an illuminating optical system 42, and an excitation filter 29. The illumination beam path is deflected at a beam splitter 30 and is focused by objective 39 onto specimen 26. Image beam path 28 proceeding from specimen 26 in turn passes again through objective 39, semitransparent beam splitter 30, and barrier filter 31. Image beam path 28 is deflected by way of a prism 44, and imaged through a tube optical system 45 into an intermediate image plane 46. This image can be observed using eyepieces 35.

The cube-shaped fluorescence filter block 18 arranged to the right in FIG. 6, which comprises beam splitter 30, excitation filter 29 in the illumination beam path, and barrier filter 31 in the image beam path, is mounted on a retainer that in turn is a component of cylindrical retaining device 17. The manner of retention will not be discussed hereinafter; it is the subject matter of German patent DE 199 36 497 C2 already cited above. It is evident from FIG. 6 that multiple optical components 18, in this case fluorescence filter blocks 18, are to be mounted on cylindrical retaining device 17.

Cylindrical retaining device 17 is mounted coaxially rotation axis 13 of rotary disk 1 according to the present invention. Rotary disk 1 comprises, above each blocking filter 31, an open orifice 3 for the unimpeded passage of image beam path 28. On its outer rim, rotary disk 1 possesses a tooth set 14 into which a pinion 15 of an electric drive motor 16 engages. Rotary disk 1 is thus movable via drive motor 16 into a specific position, precise adjustment into the selected position being accomplished by detents 5 on rotary disk 1.

By means of a code 40 on the outer rim of rotary disk 1, information can be provided as to the fluorescence filter block 18 currently pivoted into the illumination and image beam paths. For that purpose, code 40 can be read off by a user or read out automatically by a corresponding sensor, and associated with fluorescence filter block 18 that is pivoted in.

In the exemplifying embodiment according to FIG. 6, rotary disk 1 according to the present invention can have on its raceway 4 detents 5 such as those depicted, for example, in FIG. 1. Detents 5 themselves are depicted in detail in FIGS. 2 and 5.

One skilled in the art can, of course, also transfer the invention explained with reference to FIG. 6 to other microscopes 25 and other optical components 18.

The invention permits highly precise positioning, with little noise and little vibration, of rotary disk 1 and thus of optical components 18 carried by it simultaneously with a large capture region for the detent. Detents 5 and ball bearing 6 are not shown in FIG. 6 because of the size relationships and for clarity's sake; the reader is referred for that purpose to the previous Figures.

Figure 7A:
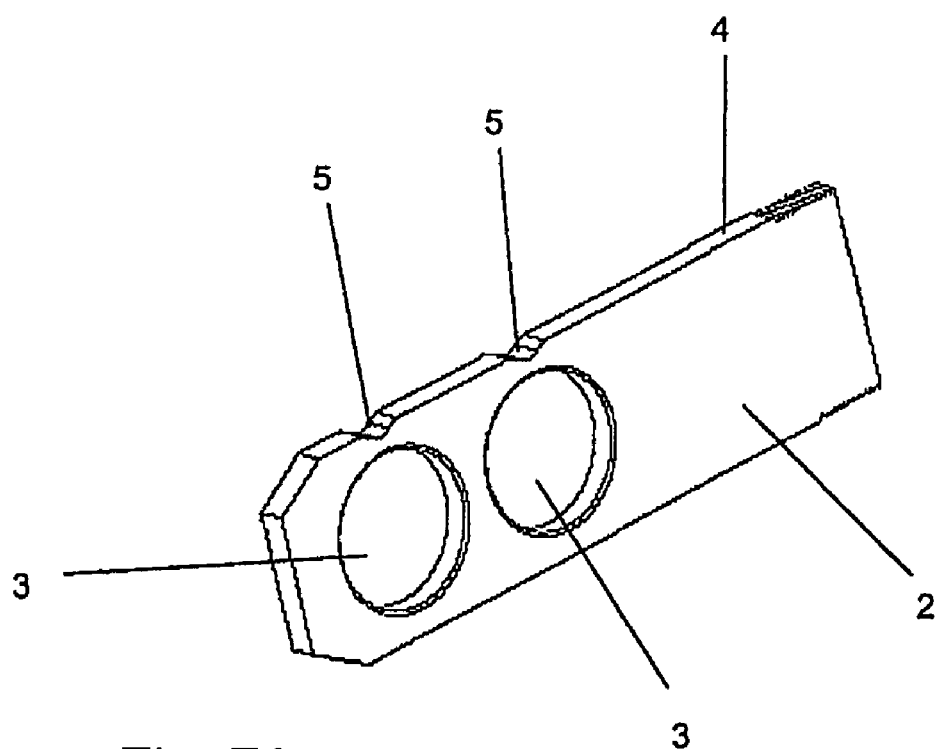
FIG. 7 shows a longitudinal slider according to the present invention, in a perspective view (FIG. 7A); and a portion of the longitudinal slider with a ball bearing in click-stop engagement, in cross-section in the longitudinal direction (FIG. 7B).

FIG. 7 shows, in two different views, a longitudinal slider 2 according to the present invention constituting a device for retaining optical components. This longitudinal slider 2 is depicted in a perspective view in FIG. 7A. It comprises open orifices 3 arranged next to one another in a longitudinal direction, only two orifices 3 being depicted in this exemplifying embodiment. The longitudinal slider can also, of course, have a different number of orifices 3, for example four, eight, or more orifices 3. Provided on the upper lateral outer rim of longitudinal slider 2 is a raceway 4 having detents 5 which are embodied in such a way that they are to be brought into click-stop engagement with a ball bearing 6 running along raceway 4, in order to hold longitudinal slider 2 a selected position. In this exemplifying embodiment two detents 5 are provided, each associated directly with one open orifice 3.

According to the present invention, detents 5 are embodied as a combination of two arc-shaped profiles, an outer profile 11 of lesser curvature surrounding an inner profile 10 of greater curvature. This situation is depicted graphically in FIG. 7B. This Figure is a cross section, in the longitudinal direction of longitudinal slider 2 depicted in. FIG. 7A, in the region of a detent 5 and the associated open orifice 3. It depicts a ball bearing 6 running along raceway 4 and brought into click-stop engagement with detent 5.

Figure 7B:
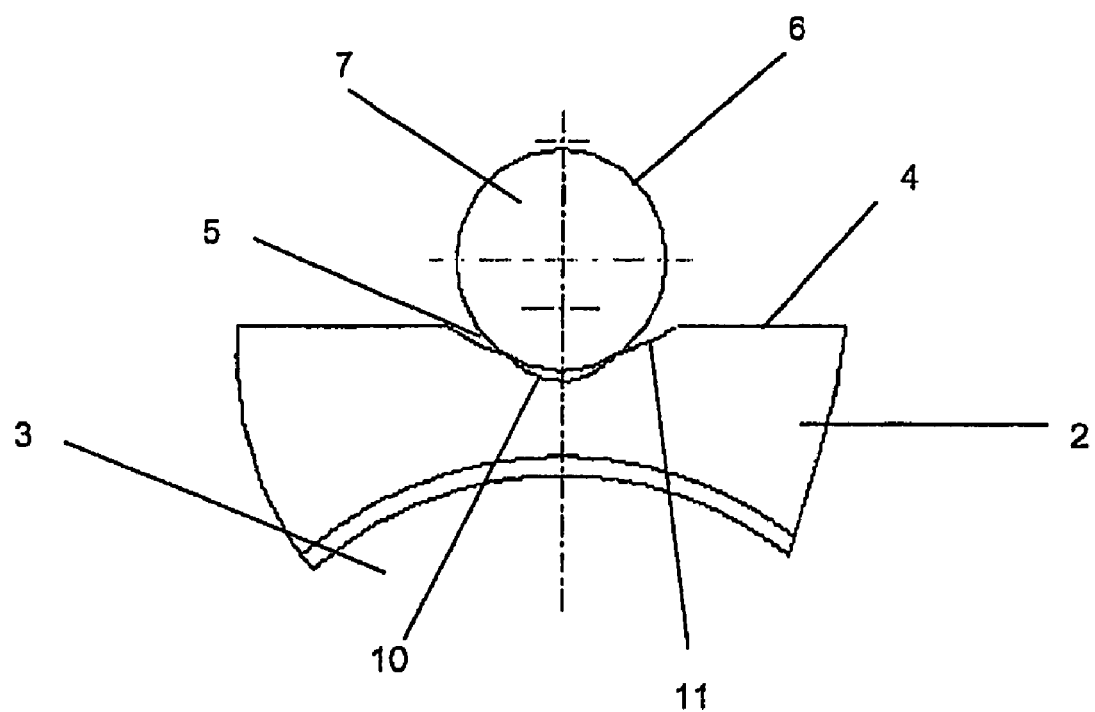

In terms of the configuration of the two profiles 10 and 11, what has already been stated in conjunction with a rotary disk also applies. The reader is further referred to the exemplifying embodiments in accordance with FIGS. 2, 4, and 5 with regard to possible geometries of profiles 10 and 11. Circular profiles, such as those depicted in FIG. 5 are intended to be the basis for the present example as shown in FIG. 7B. Ball bearing 6 that is in engagement with detent 5 is depicted only schematically in FIG. 7B. The tooth set for a drive pinion that shifts longitudinal slider 2 in the longitudinal direction is also merely schematically depicted in FIG. 7A at one end of longitudinal slider.

Detents 5 guarantee highly accurate positioning of longitudinal slider 2, thus ensuring that optical components (for example, fluorescence filter blocks) retained on longitudinal slider 2 can be brought into an exact position in an optical device (such as a fluorescence microscope) and held there. Longitudinal slider 2 depicted in FIG. 7 can, of course, also be used in a microscope depicted in FIG. 6. For that purpose, the optical components (such as fluorescence filter blocks 18) associated with open orifices 3 are introduced by corresponding displacement of longitudinal slider 2, in a manner analogous to that depicted in FIG. 6, into illumination beam path 27 and image beam path 28. One skilled in the art will moreover be able, without difficulty to transfer to longitudinal slider 2 depicted in FIG. 7 all the embodiments and adjustment capabilities that have been discussed above in conjunction with the rotary disk according to the present invention.

FIG. 7B schematically depicts, in cross section, ball bearing 6 as well as detent 5 in raceway 4 of longitudinal slider 2. The two arc-shaped (circular) profiles 10 and 11 are once again clearly visible here. Ball 7 of ball bearing 6 is held in the transition region of the two profiles, i.e. on the edge of inner profile 10. When longitudinal slider 2 is moved or driven in the longitudinal direction, ball bearing 6 firstly runs on raceway 4 until it reaches the outer region of detent 5. Driving of the longitudinal slider can be switched off at that point in time. This is because ball 7 is then constrainedly guided into the location shown in FIG. 7B, where it reaches its fixed position. Click-stopping is accomplished in gentle and low-vibration fashion, thus making it possible to work without vibration while simultaneously minimizing stress on the mechanical components. This is advantageous, for example, when using longitudinal slider 2 in a fluorescence microscope 25 as shown in FIG. 6.

Information as to the position currently being occupied can be provided by means of a code (not depicted in FIG. 7) on the rim of longitudinal slider 2 (compare code 40 on the rim of rotary disk 1 in FIG. 6). What was stated in conjunction with the rotary disk once again applies analogously here. In FIG. 7, detents 5 are arranged directly next to open orifices 3 in longitudinal slider 2. A configuration in which detents 5 are arranged in raceway 4 between open orifices 3 is, of course, also possible.

The invention permits highly precise positioning, with little noise or vibration, of longitudinal slider 2 and thus also of the optical components that it carries, simultaneously with a large capture region for the detent.

PARTS LIST

1 Rotary disk; device for retaining optical components
2 Longitudinal slider; device for retaining optical components
3 Open orifices
4 Raceway
5 Detent
6 Ball bearing
7 Ball
8 Spring mount, leaf spring
9 Axis of symmetry
10 Inner profile
11 Outer profile
12 Central opening (in rotary disk)
13 Rotation axis
14 Tooth set
15 Pinion
16 Motor
17 Retaining device
18 Optical components, fluorescence filter blocks
19 Center point of circle radius $r_1$, fluorescence profile 11
20 Center point of circle radius $r_2$ for inner profile 10
25 Microscope, fluorescence microscope
26 Specimen
27 Illumination beam path
28 Image beam path
29 Excitation filter
30 Beam splitter
31 Barrier filter
32 Lamp housing
33 Light source
34 Tube
35 Eyepieces
36 Specimen stage
37 Adjusting unit
38 Objective nosepiece
39 Objective
40 Code
41a, b Apertures
42 Illuminating optical system
44 Prism
45 Tube optical system
46 Intermediate image plane

What is claimed is:

1. A device for retaining optical components, comprising:
a plurality of open orifices disposed next to one another in an arrangement;
a raceway corresponding to the arrangement, the raceway including a plurality of detents; and
a ball bearing configured to follow the raceway and cooperating with the detents so that each of the detents is brought, in a respective following direction, into click-stop engagement with the ball bearing so as to hold the orifices in a selected position;
wherein each of the detents has, in the respective following direction, a profile including a combination of an outer and an inner arc-shaped profile, and
wherein: the outer arc-shaped profile has less curvature than the inner arc-shaped profile and surrounds the inner arc-shaped profile;
the outer arc-shaped profile is a first circular arc of a first circle;
the inner arc-shaped profile is a second circular arc of a second circle;
the first circle has a larger radius than a radius of the second circle;
the first and second circles have different respective center points;
the first circle has a first radius larger than a radius of a ball of the ball bearing; and
the second circle has a second radius smaller than the radius of the ball.

2. The device as recited in claim 1 wherein:
the open orifices and the raceway are disposed on a rotary disk, the rotary disk including an opening at a center thereof defining a rotation axis therethrough;
the open orifices are disposed along a circle concentric with the rotation axis;
the raceway has a circular form concentric with the rotation axis; and
the ball bearing is configured to circulate on the raceway and cooperate with the detents so that each of the detents is brought into the click-stop engagement with the ball bearing so as to hold the rotary disk in the selected position.

3. The device as recited in claim 1 wherein:
the open orifices and the raceway are disposed on a longitudinal slider defining a longitudinal direction;
the open orifices are disposed next to one another parallel to the longitudinal direction;
the raceway runs parallel to the longitudinal direction; and
the ball bearing is configured to cooperate with the detents so that each of the detents is brought into click-stop engagement with the ball bearing so as to hold the longitudinal slider in the selected position.

4. The device as recited in claim 1 further comprising a tooth set disposed at an outer rim of the device, the tooth set configured for engaging a motor-driven pinion so as to move the open orifices in a direction of the raceway.

5. A microscope comprising:
an illumination beam path directed onto a specimen;
an image beam path proceeding from the specimen; and
an optical component retaining device configured to introduce a selectable optical component into at least one of the illumination and the image beam paths, the optical component retaining device including:
a plurality of open orifices disposed next to one another in an arrangement;
a raceway corresponding to the arrangement, the raceway including a plurality of detents; and
a ball bearing configured to follow the raceway and cooperating with the detents so that each of the detents is brought, in a respective following direction, into click-stop engagement with the ball bearing so as to hold the orifices in a selected position;
wherein each of the detents has, in the respective following direction, a profile including a combination of an outer and an inner arc-shaped profile, and
wherein: the outer arc-shaped profile has less curvature than the inner arc-shaped profile and surrounds the inner arc-shaped profile;
the outer arc-shaped profile is a first circular arc of a first circle;
the inner arc-shaped profile is a second circular arc of a second circle;
the first circle has a larger radius than a radius of the second circle;
the first and second circles have different respective center points;
the first circle has a first radius larger than a radius of a ball of the ball bearing; and
the second circle has a second radius smaller than the radius of the ball.

6. The microscope as recited in claim 5 wherein:
the open orifices and the raceway are disposed on a rotary disk, the rotary disk including an opening at a center thereof defining a rotation axis therethrough;
the open orifices are disposed along a circle concentric with the rotation axis;
the raceway has a circular form concentric with the rotation axis; and
the ball bearing is configured to circulate on the raceway and cooperate with the detents so that each of the detents is brought into the click-stop engagement with the ball bearing so as to hold the rotary disk in the selected position.

7. The microscope as recited in claim 5 wherein:
the open orifices and the raceway are disposed on a longitudinal slider defining a longitudinal direction;
the open orifices are disposed next to one another parallel to the longitudinal direction;
the raceway runs parallel to the longitudinal direction; and
the ball bearing is configured to cooperate with the detents so that each of the detents is brought into click-stop engagement with the ball bearing so as to hold the longitudinal slider in the selected position.

8. The microscope as recited in claim 5 wherein the optical component retaining device includes a tooth set disposed at an outer rim of the device, the tooth set configured for engaging a motor-driven pinion so as to move the open orifices in a direction of the raceway.

* * * * *